D. J. POWERS.

Assignor to UNION WIRE MATTRESS CO.

Woven-Wire Mattress-Frames.

No. 9,105. Reissued Mar. 2, 1880.

*Witnesses:*
A. W. Bond.
H. L. Bruns.

*Inventor:*
David J. Powers

N. PETERS, PHOTO-LITHOGRAPHER, WASHINGTON, D. C.

UNITED STATES PATENT OFFICE.

DAVID J. POWERS, OF CHICAGO, ILLINOIS, ASSIGNOR TO UNION WIRE MATTRESS COMPANY, OF SAME PLACE.

WOVEN-WIRE-MATTRESS FRAME.

SPECIFICATION forming part of Reissued Letters Patent No. 9,105, dated March 2, 1880.

Original No. 142,940, dated September 16, 1873. Application for Reissue filed December 20, 1878.

*To all whom it may concern:*

Be it known that I, DAVID J. POWERS, of the city of Chicago, in the county of Cook and State of Illinois, have invented certain new and useful Improvements in Tightening Devices for Woven-Wire Mattresses; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

Figure 1:
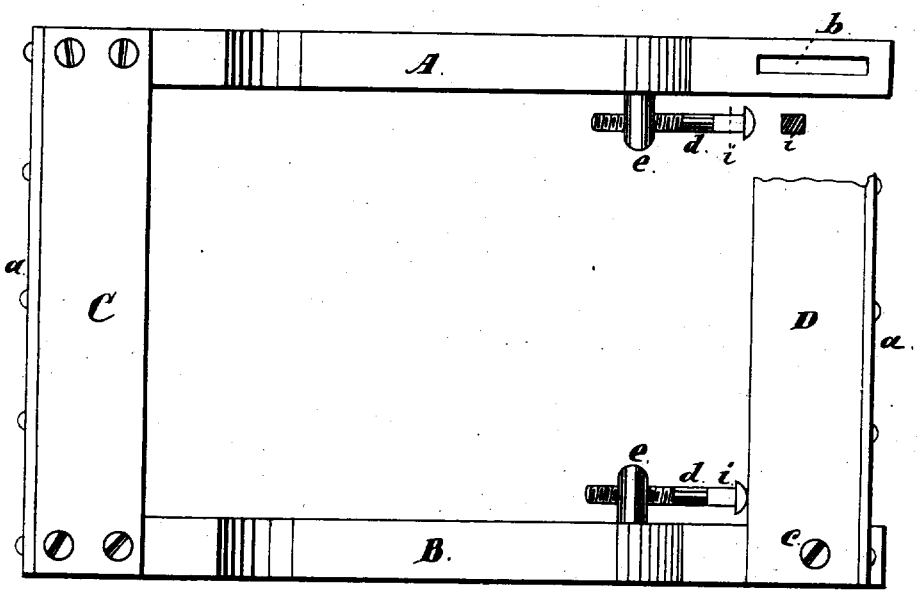
Figure 3:
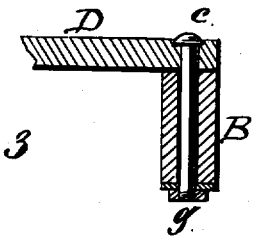
Figure 2:
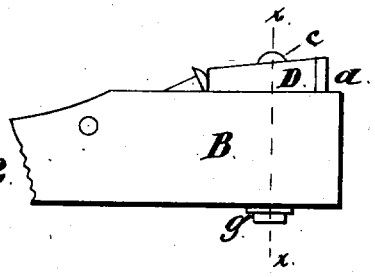

Figure 1 is a plan view of the frame, a portion of the same being cut away; Figs. 2 and 3, details, Fig. 3 being a section on line *x* of Fig. 2.

My present invention is an improvement on the bed-bottom patented to me February 25, 1873; and its object is to provide a better mode of tightening the woven wire, the frame at the same time being so constructed that the frame can be readily taken apart and the mattress packed for transportation.

In the drawings, A B represent the side pieces of the frame, in one end of which is a long slot, *b*.

C D are cross-pieces, at the ends of the frame, one of which, C, is secured to the side pieces by screws, while the other, D, is held in place by means of two clamp-bolts, *c*, one at each end, passing through the slots *b* and secured by a nut, *g*.

*a a* are strips, between which and the end pieces, C D, the woven wire is to be secured by means of screws or otherwise.

*d d* are tightening-bolts. Each bolt has a head bearing against the inner edge of the cross-piece D, a screw-thread upon one end, and a square portion, *i*, to which a wrench may be applied to turn it.

*e e* are nuts permanently secured to the side pieces, A B, through which the bolts *a* pass. By loosening the nuts upon the ends of the bolts *c* and turning the tightening-bolts *d* any requisite amount of strain may be given to the woven wire, and when properly tightened the end piece, D, can be secured in position by means of the nut *g*.

This construction furnishes a very ready and efficient mode of tightening the woven wire, the bolts *c* having a longitudinal movement in the slots *b*, and even if the nuts *g* are not made very tight the tightening-bolts *d* prevent the cross-piece D from being drawn toward the center by the strain upon the fabric.

The frame is so constructed that the upper sides of the cross-pieces C D slope inward, so that when the weight is placed upon the fabric the strain will be from the extreme ends, and the fabric will not rest upon the inner edges of these cross-pieces. This sloping may be obtained either by making the cross-pieces thinner on the inner than on the outer edges, or by notching them at their ends, or by notching the ends of the side pieces.

The mattress can be readily taken apart by removing the end pieces, C D. The woven wire can be rolled up on one of these end pieces and the whole packed for transportation.

I do not claim, broadly, the end stretching of the fabric, as that has heretofore been done by passing straining-bolts through end rails separate and distinct from the end rail or bar to which the fabric is fastened, which occasions a shortening of the length of the fabric, whereas by so placing the tightening-bolts inside of the end rails that they operate against the inner edge of the end rails the entire length of the fabric is retained; and by this inside location of the bolts they can be reached for straining the fabric at any time without taking the bed-bottom from its place. Besides, a stronger and cheaper frame is provided.

What I claim as new is as follows:

1. The side pieces, A B, provided with the slots *b*, bolts *c*, and cross-piece D, in combination with the nuts *e e* and bolts *d d*, each provided with a head to fit in the recesses in the piece D, a screw-thread, and wrench-surface, all constructed and arranged as and for the purpose specified.

2. The straining and pressing bolts *d*, located between the end rails, and having one end connected with a side rail, in combination with a movable end rail held in place by retaining-bolts and slots, substantially as specified.

DAVID J. POWERS.

Witnesses:
O. W. BOND,
H. F. BRUNS.